March 13, 1973  B. O. J. S. MORNER  3,720,386
FISHING REEL WITH CLUTCH

Filed May 26, 1970  3 Sheets-Sheet 1

INVENTOR.
BY Bengt O.J.S. Mörner
Cifelli & Behr
Attorneys

United States Patent Office 3,720,386
Patented Mar. 13, 1973

3,720,386
FISHING REEL WITH CLUTCH
Bengt O. J. S. Morner, Ryetvagen 9, Hovas, Sweden
Filed May 26, 1970, Ser. No. 40,637
Int. Cl. A01k 89/02
U.S. Cl. 242—217  4 Claims

ABSTRACT OF THE DISCLOSURE

The present invention relates to a fishing reel comprising a frame, a drive shaft rotatably journalled in said frame, a crank for rotating said drive shaft, a line spool rotatably journalled in said frame and for receiving a line to be wound up in a predetermined direction, a drag clutch providing drive connection between said drive shaft and said line spool, said drag clutch comprising a first clutch element in driving connection with said drive shaft, a second clutch element in driving connection with said drive shaft and axially displaceable relative to the first clutch element, spring means for forcing said second clutch element towards said first clutch element, and friction surfaces provided on said line spool between said first and second clutch elements, means provided for displacing said displaceable second clutch element against the action of said spring means when the drive shaft rotates in a direction opposite to the predetermined direction in which the line is wound up.

DESCRIPTION OF THE PRIOR ART

The present invention relates to fishing reels comprising a line spool which is rotatably journalled in a frame and which is rotatable in the winding-up direction by means of a crank through the intermediary of a drag clutch, the transmitting torque of which is adjustable by varying the pressure from a spring device adapted for pressing the clutch members against one another.

In fishing reels of the above kind the drag clutch is usually combined with a reverse catch for the crank mechanism. The intention is to allow a fish to pull out line from the line spool with a predetermined frictional drag while preventing the crank from rotating backwards. The frictional drag which is adjustable by varying the spring pressure acting upon the drag clutch is usually adjusted to the rod and the strength of the line. Certain types of fishing rolls are also provided with a mechanism which slightly reduces the frictional drag when the crank is moved backwards, that is in the direction opposite to the winding-up direction, whereupon the reverse catch by means of an angular motion effects a reduction of said spring power. This makes it possible to compensate for the friction of the line in the spool and in the eyelets of the rod when the line is drawn out, so that the fish will be subjected to the same force when the line is drawn out as when it is pulled in. If it is desired to change the magnitude of this force this must be made by means of the adjustment knob which is provided for varying the spring pressure acting upon the drag clutch. However, this type of mechanism for reducing the braking force is of no use in case the frictional drag has been misadjusted and it is necessary to rapidly change the drag for avoiding breakage of the line, or when a great length of line is rapidly drawn out whereat the diameter of the line spool decreases rapidly, with the result that the braking force in the line will increase rapidly.

SUMMARY OF THE INVENTION

The object of the invention is to provide a fishing reel of the kind set forth above in which the braking force is automatically varied for compensating the line friction when the line is drawn out, the range of automatic adjustment extending to complete disconnection of the line spool, without the need for releasing the crank, and wherein the braking force is adjustable.

A fishing reel according to the invention is characterized by a device connected to the crank mechanism which device is adapted, when the crank is moved in a direction opposite to the winding-up direction, to influence the spring means in such a manner that the clutch members will be successively relieved from the spring pressure, while at the same time the crank mechanism will be subjected to a successively increasing braking force which opposes the movement of the crank in the direction opposite to the winding-up direction.

DESCRIPTION OF THE DRAWINGS

The invention will be more closely described herebelow with reference to the accompanying drawings wherein.

DESCRIPTION OF THE PREFERRED EMBODIMENTS

Figure 1:
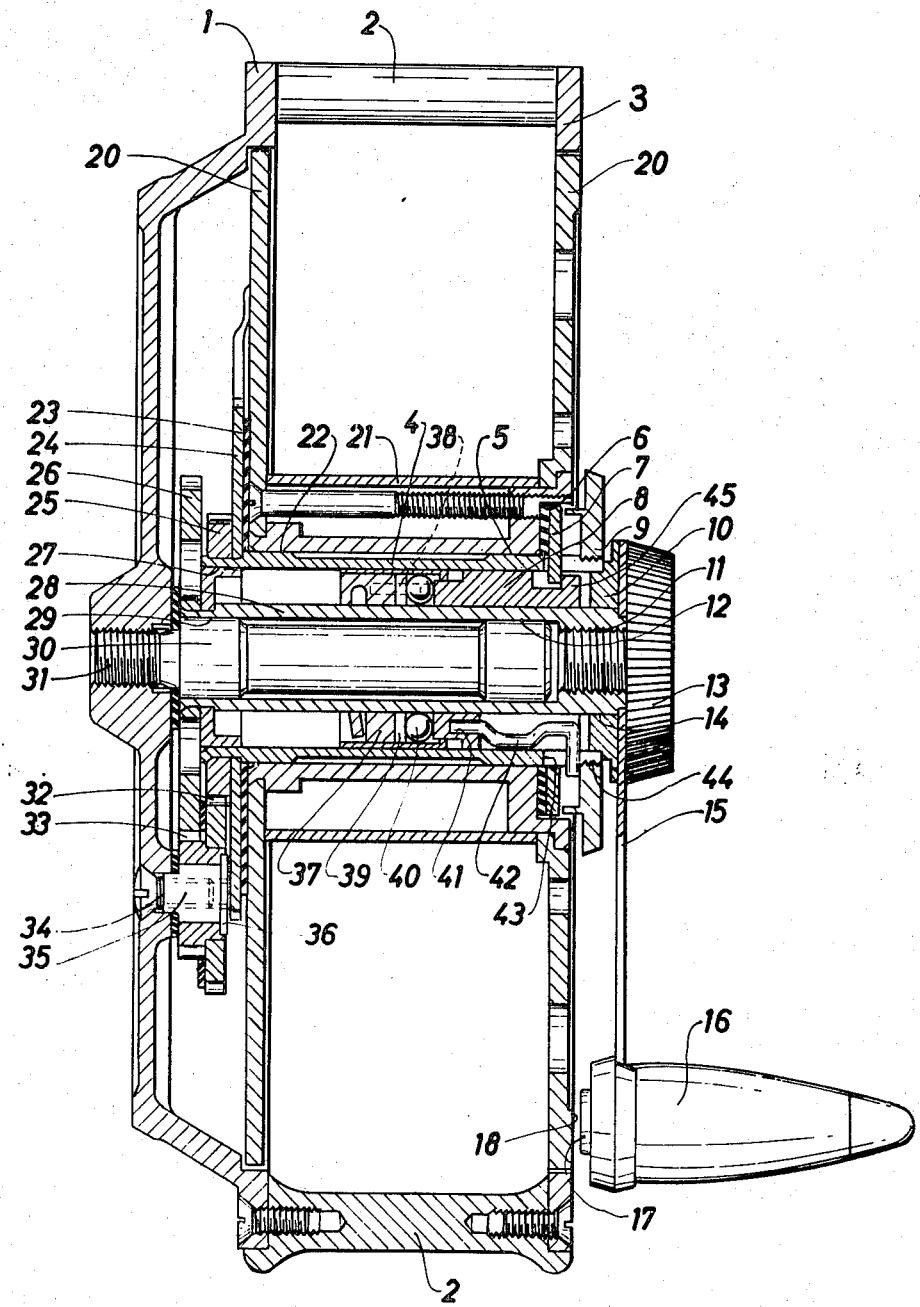
FIG. 1 is an axial cross section through a fishing reel made in accordance with the invention.

As will appear from FIG. 1, the frame of the reel is composed by a cup-shaped side wall 1 and a ring 3 interconnected by means of a number of spacer elements 2 of which only two are shown in FIG. 1. The frame is further provided with means not shown in the drawings for attaching the roll to a fishing rod. A shaft 30 is attached to the side wall 1 of the frame. A drive shaft 28 is rotatably journalled on the shaft 30 and 29 and 12.

Secured to the drive shaft 28 are a gear ring 26 and a ring 37, the latter being provided on a cylindrical middle portion of the shaft. One end 11 of the drive shaft 28 is provided with an internal thread and an external square portion on which a crank arm 15 is non-rotatably attached to the drive shaft. The crank 15 is secured by means of a screw 13 which is screwed into the internal thread of the drive shaft end portion 11.

At the outer end of the crank arm there is provided a crank handle 16. A friction pad 17 is provided on the inner side of the crank. The crank 15 is made of resilient material so that the friction pad 17 may be brought against a surface 18 on the line spool by pressing the crank 15 towards the spool.

The ring 37 on the cylindrical middle portion of the drive shaft 28 carries two axial cams 39 lying against the ring 37. At the outer ends of the cams there are provided pins 38 secured to the ring 37 and serving to retain the cams 39 and to prevent them from angular displacement with respect to the drive shaft 28. The pins 38 also form end stops for a roller element lying against each cam, said roller elements in the embodiment shown being in the form of balls 40. The cams 39 are preferably made so that they may be turned around with respect to the drive shaft 28. The driving mechanism of the roller also includes a sleeve-shaped intermediary shaft 4 which is rotatably journalled on the drive shaft at 27 and by the intermediary of a bushing 10 at 14. The intermediary shaft 4 carries a gear ring 25 with smaller diameter than the gear ring 26 on the drive shaft 28, a thrust washer 24, and has a cylindrical middle portion connecting to an end portion provided with a screw thread 44 and four grooves 43.

Figure 3:
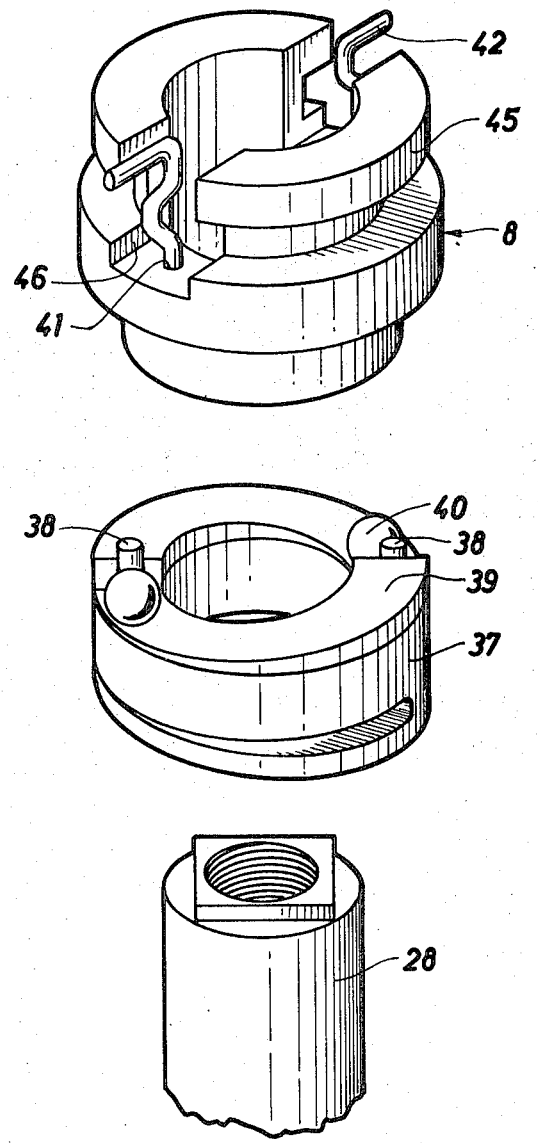
FIG. 3 is an exploded view in perspective and to a larger scale of certain details in the reel.

Rotatably journalled on the drive shaft 28 is a ring 8 which has two notches 46 (see FIG. 3), a bore 41 being provided in the bottom of each notch and an angular groove connecting to a flange 45. In the notches 46 there are provided two springs 42 the ends of which are inserted into the bores 41 and the opposite radially outwardly extending ends of which are disposed in the grooves 43 on the intermediary shafts 4. The springs 42 thus act as drive dogs between the rings 8 and the intermediary shaft 4. A thrust plate 7 rests against flange 45 and has two inwardly extending projections which are insertable inside of the flange 45 through the notches 46. The ring 8 has an axial surface which rests, via the balls 40, against the cams 39. By axial displacement of the ring 8 and the flange 45, may be pressed against the thrust plate 7. This displacement may be effected by means of a nut 9 which engages the threaded portion 44 of the intermediate shaft 4 and which rests against the ends of the springs 42. By turning the nut 9 the spring tension may be varied. The nut 9 may also be screwed into contact with the thrust plate 7.

The line spool comprises a central portion 21 journalled on the cylindrical portion of the intermediate shaft 4 at 22 and 5 and two side flanges 20 between which the line is wound up. Friction elements 6 and 23 are attached to the line spool on the central portion 21 and the side flange 20. The arrow in FIG. 2 indicates the direction of rotation of the line spool when the line is being wound up. The crank is then rotated in the same direction. When a length of line is wound up, the line spool and the crank will thus rotate in the same direction. When a length of line is drawn out the line spool will rotate in a direction opposite to the direction indicated by the arrow. Since the line spool 20, 21 is mounted on the intermediate shaft 4 it is disposed between the thrust plates 24 and 7 which are pressed against the spool by the springs 42 lying against the nut 9. In this manner the line spool will be frictionally connected with the intermediate shaft. The torque which may be transmitted may be varied by varying the tension of the springs 42 by means of the nut 9. If the nut is set hard against the thrust plate 7 the line spool and the intermediate shaft may be considered as being rigidly interconnected. The thrust washer 24 and the thrust plate 7 are not rotatable relative to the intermediate shaft. For the power transmission between the drive shaft and the intermediate shaft there is provided a double gear 32, 33 engaging the gear 25 on the intermediate shaft 4 and the gear 26 on the drive shaft 28, respectively. The double gear 32, 33 is journalled on a stud shaft 35 which is provided with a flange 36 preventing the double gear from being drawn off from the shaft 35, and is maintained by means of a screw 34 in the side member 1 of the frame. The drive shaft 28 is prevented from being drawn off from the shaft 30 by cooperation between the flanges provided with the gears 26 and 32.

When the fishing reel is assembled and the thrust plate 7 rests againt the line spool 20, 21 under the influence of the pressure from the springs the ball 40 should have a very slight play when it is disposed at the lowest point of the cam surface 39 and the thrust plate 7 at the same time is pressed against the abutting surface between said cam surface and the axial surface on the ring 41. This is obtained by suitable dimensioning of and placing of those elements which affect the distance between the cam surface and the axial surface. A displacement of the ball 40 towards the higher portion of the cam surface will result in an axial displacement of the ring 8 which in turn will result in a compression of the springs 42 and a decrease of the pressure of the flange 45 against the thrust plate 7, so that the pressure of the thrust plate 7 against the line spool 20, 21 will be decreased. This will cause a successive decrease in the torque transmitting capability of the drag clutch between the line spool and the intermediate shaft. At a certain displacement of the ring 8 the line spool 20, 21 will run completely freely on its bearings 22, 5 and the ring 8 will abut the bushing 10 which will then be pressed against the crank 15.

The elements partaking in the function described above must of course be designed in such a manner that the spring forces and the spring movements will correspond to the pitch of the cam surface in such a way that the intended function is obtained.

As mentioned above, the ball has a very slight play when it is disposed at the lowest portion of the cam surface of the cam 39. In this position, the friction between the ring 37 and the ring 41 over the cam surface 39 and the balls 40 is very insignificant. The drive shaft 28 and the intermediate shaft 4 may thus rotate freely at those relative speeds which are determined by the gearing 25, 26, 32, 33. If the ball 40 moves towards the higher portion of the cam 39, and axial pressure will arise across said parts due to compression of the springs 42. The drive shaft 28 and the intermediate shaft 4 may then not rotate completely freely relatively to one another, but instead a certain blocking occurs over the gearing 25, 26, 32, 33 due to the friction between the parts 8, 10 and 15. The complete drive mechanism comprising the drive shaft 28 and the intermediate shaft 4 is thereby braked against rotation. It will be seen that this braking occurs simultaneously with the decrease in the torque transmitting capability of the drag clutch between the intermediate shaft and the line spool via the washers 22 and 6. The braking force and the transmission torque are thus inversely proportionally related to one another, although not necessarily according to a linear function.

With reference to the above description and the attached drawings, the mode of operation for some cases of use will be described herebelow.

The line is drawn out while the crank is held immobile

Figure 2:
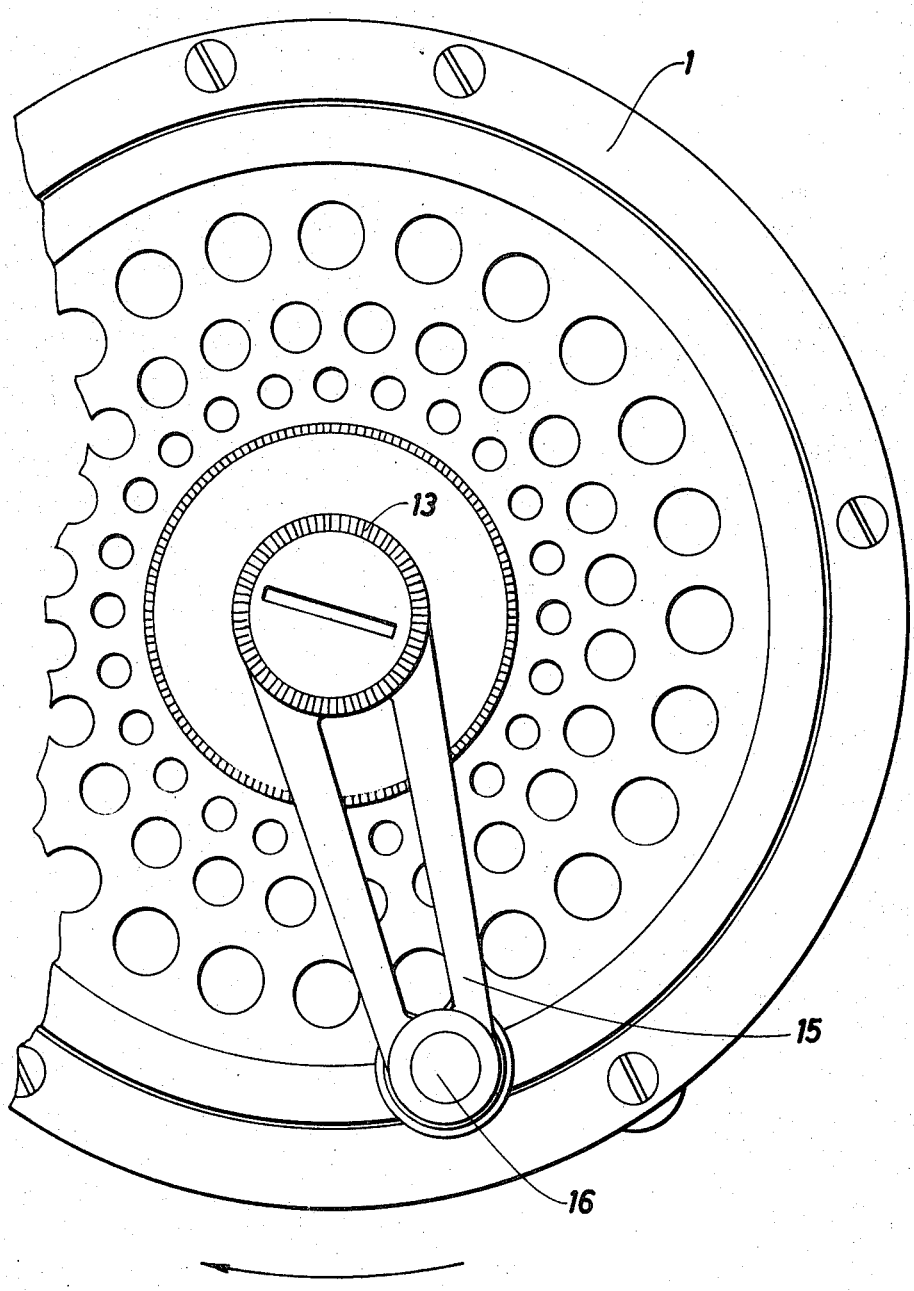
FIG. 2 shows the reel seen from one side.

When the line is drawn out, the line spool 20, 21 will rotate in a direction opposite to the direction indicated by the arrow in FIG. 2. Since the crank is maintained in a fixed position, the intermediate shaft 4 cannot participate in the rotation, so that there will be a certain frictional drag at the washers 23 and 6. Also, since the crank 15, 16 is maintained immobile no relative movement between the cam surface 39 and the ring 41 occurs. The balls 40 will then be positioned at the lowest portion of their respective cam surfaces 39. As previously mentioned, there will then be no pressure against the ring 8 so that the springs 42 may act with their full force against the thrust plate 7. The tension of the springs 42 and thus their spring pressure is determined by the position to which the nut 9 has been screwed on to the threaded portion 44 of the intermediate shaft. Thus, if the crank 15, 16 is held immobile, there will be no decrease of the power to which the spring 8 has been adjusted. This means that the friction between the intermediate shaft 4 and the line spool 20, 21 will have its maximum value with respect to the adjustment position in question.

The line is drawn out and the crank is simultaneously moved backwards

If the crank 15, 16 is moved backwards, that is in the direction opposite to that indicated by the arrow in FIG. 2, the intermediate shaft 4 and the drive shaft 28 are caused to rotate in the same direction as the crank 15, 16. By the action of the gearing 25, 26, 32, 33 the intermediate shaft 4 will then rotate at a higher speed than the drive shaft 28. The balls 40 will then be brought by the axial surface of the ring 8 up towards the higher portion on their respective cam surfaces 39 in the manner described hereinbefore. This will cause an axial displacement of the ring 8 which in turn results in a decreased pressure from the thrust plate 7 against the friction element 6 and the line spool 20, 21. The friction between the line spool and the intermediate shaft will then decrease and thereby also the pull in the line. The more the crank 15, 16 is moved backwards the more the balls 40 will ascend on the cam surfaces 39. This will cause, in the manner previously described, a successive decrease of the friction between the line spool and the intermediate shaft until the line spool is completely disengaged. The line may then be pulled out without any other resistance than the friction in the bearings 22 and 5 and the friction in the eyelets on the fishing rod.

Simultaneously with the displacement of the ring 8 the friction between the parts 8, 10 and 15 will cause an increasingly higher resistance against the backwards movement of the crank 15, 16. When the balls 40 have reached their highest position a frictional resistance occurs which clearly indicates that the maximum disengagement of the clutch has been reached. However, the crank may be forced further backwards without injury to any element in the mechanism.

The line is pulled out while the crank is free

When the line spool 20, 21 rotates due to a pull in the line, the spool will tend to bring along the intermediate shaft in the rotation by the action of the frictional connection between the spool and the intermediate shaft. To begin with, this will cause the intermediate shaft 4 to move slightly opposite to the direction indicated by the arrow in FIG. 2. This movement is transmitted to the drive shaft 28 through the gearing 25, 26, 32, 33, the drive shaft then rotating at a lower speed. The balls 40 will then be moved in the manner previously described up on the cam surfaces 39 and a certain release of the pressure on the thrust plate 7 is obtained. At the same time, a certain braking between the intermediate shaft 4 and the drive shaft 28 occurs in the manner described. This means that the drive shaft 4 will present a certain resistance when the line spool 20, 21 tends to bring the drive shaft along in its rotation.

The decrease in the friction between the line spool and the intermediate shaft and the simultaneous increase of the resistance to rotation of the driving mechanism comprising the intermediate shaft and the drive shaft 28 has the result that the crank will automatically be moved back to a position where the forces balance each other. This balancing also compensates for the friction of the line in the rod eyelets etc. and automatically takes the adjusted maximum torque in consideration. In practice, this automatic balancing means that the resistance which has to be overcome when the line is drawn out decreases as the speed of the line increases.

Pulling in of the line

When the line is pulled in, the line spool 20, 21 in the embodiment illustrated rotates in the direction indicated by the arrow in FIG. 2. This is obtained by rotating the crank 15, 16 in the same direction. As previously mentioned, the intermediate shaft 4 and the line spool 20, 21 will then be driven at a higher speed than the drive shaft 28. The ring 41 then tends to move the balls 40 towards the lowest part of their cam surfaces 39. The drive shaft 28 and the intermediate shaft 4 may then turn practically free relative to one another so that there will be no breaking in the pulling-in direction. Said position of the balls 40 also means that there will be no decrease of the adjusted torque between the intermediate shaft 4 and the line spool 20, 21. The line may thus be wound up with the complete force allowed by the position to which the nut 9 has been adjusted. Preferably this force is so adjusted that the spool will begin to drag at a resistance which is smaller than the resistance which will involve the risk of line breakage. As will be clear from the description of the operation when the line is pulled out, the adjustment of the braking of the line spool may be made with the same crank as is used for winding-up the line. It is therefore possible to immediately switch from pulling-in to letting out of the line with an adjusted degree of braking.

As previously mentioned, the nut 9 may be screwed hard against the thrust plate 7. This eliminates the drag clutch action which may be of advantage under certain circumstances. If it is desired to brake the line spool 20, 21 harder than the braking which is effected by the pressure from the thrust plate 7, the crank 15, 16 may be pushed inwardly thanks to the resilience of the crank arm 15, so that the friction pad 17 will be pressed against the surface 18 on the line spool 20, 21. By pressing the friction pad 17 against the line spool it is also possible to obtain a greater winding-up force.

The direction in which the line spool 20, 21 rotates when the line is pulled in is determined by the direction in which the height of the cams 39 increases with respect to the drive shaft 28. As shown in the drawings, each cam is a separate symmetrical unit which may be turned around with respect to the drive shaft 28. It is therefore possible to construct, from the same elements, fishing reels for either direction of rotation just by turning around the cams 39.

The invention is not limited to the embodiment hereinbefore described and shown in the drawings as an example only, said embodiments being capable of modifications with respect to its details within the scope of the appended claims. The invention has been described here applied to a fly fishing reel. It should be understood, however, that the invention may also be applied to other types of fishing reels. With respect to the gearing for stepping up the rotation of the crank there are many possibilities of variation within the scope of the invention. In certain types of reels the gearing may be omitted. It is also possible to replace the gearing by frictional transmission elements. If the cams are allowed to rotate only in one direction the roller elements 40 may be omitted and the ring 41 may be provided with pinlike axial projections.

What I claim is:

1. A fishing reel comprising a frame, a drive shaft rotatably journalled in said frame, a crank for rotating said drive shaft, a line spool rotatably journalled in said frame and for receiving a line to be wound up in a predetermined direction, a drag clutch providing drive connection between said drive shaft and said line spool, said drag clutch comprising a first clutch element in driving connection with said drive shaft, a second clutch element in driving connection with said drive shaft and axially displaceable relative to the first clutch element, spring means for forcing said second clutch element towards said first clutch element, and friction surfaces provided on said line spool between said first and second clutch elements, means provided for displacing said displaceable second clutch element against the action of said spring means when the drive shaft rotates in a direction opposite to the predetermined direction in which the line is wound up and a friction surface provided in driving connection with the drive shaft and an element connected with the crank and such element having a braking surface formed thereon, and wherein displacement of said displaceable clutch element against the action of said spring means places said last named friction surface in driving connection with said braking surface and thereby provide increasing braking action to the drive shaft and provides decreasing braking action to the line spool.

2. A fishing reel comprising a frame, a drive shaft rotatably journalled in said frame, a crank for rotating said drive shaft, an intermediate shaft rotatably journalled on the drive shaft, gearing provided to connect said drive shaft and said intermediate shaft and for rotating said intermediate shaft when said drive shaft is rotated, a line spool rotatably journalled on said intermediate shaft, and for receiving a line to be wound up in a predetermined direction, a spring loaded drag clutch providing drive connection between said intermediate shaft and said line spool, said drag clutch comprising a first clutch element secured to said intermediate shaft, spring means supported on said intermediate shaft, a second clutch element axially displaceable on said intermediate shaft and influenced by said spring means, and friction surfaces provided on said line spool between said first and second clutch element sand in driving connection with the intermediate shaft, a braking surface in driving connection with the crank, means being provided to displace said displaceable second clutch element against the action of said spring means and to press said friction surface connected with the intermediate shaft against braking surface connected with the crank when the said drive shaft rotates in a direction opposite to the predetermined direction in which the line is wound up.

3. A fishing reel comprising a frame, a tubular drive shaft rotatably journalled in said frame by means of a stud shaft secured to the frame, a crank for rotating said drive shaft, a tubular intermediate shaft rotatably journalled on the drive shaft and forming an annular space around the drive shaft, gearing provided to connect said drive shaft and said intermediate shaft for rotating said intermediate shaft when said drive shaft is rotated, a line spool rotatably journalled on said intermediate shaft and for receiving a line to be wound up in a predetermined direction, a spring loaded drag clutch providing drive connection between said intermediate shaft and said line spool, said drag clutch comprising a first clutch element secured to said intermediate shaft, a second clutch element axially displaceable on said intermediate shaft, springs for forcing said second clutch element against the first clutch element, friction surfaces provided on said line spool between said first and second clutch elements, a friction surface provided on the intermediate shaft, an element connected with the crank, and provided with a braking surface corresponding to the friction surface provided in the intermediate shaft means provided in the annular space for displacing the second clutch element against the action of said spring force and for displacing the intermediate shaft to press the friction surface on the same against the braking surface provided on the element connected with the crank when the drive shaft rotates in a direction opposite to the predetermined direction in which the line is wound up.

4. A fishing reel as claimed in claim 3, wherein said means provided for displacing the second clutch element and the intermediate shaft comprising a member provided with a number of helicoidal cam surfaces, a member provided with an axial surface, and rolling elements provided between said surfaces on said members and said rolling elements provided in a number corresponding to the number of cam surfaces, said members arranged to be forced in an axial movement away from each other when they are under the influence of a movement of the drive shaft in a direction opposite to the predetermined direction in which the line is wound up and said members are rotated relative to each other so that the rolling elements are moving along said helicoidal cam surfaces whereby said axial movement of said members causes said displacing of the second clutch element and the intermediate shaft.

References Cited

UNITED STATES PATENTS

| | | | |
|---|---|---|---|
| 2,593,872 | 4/1952 | Gohde | 242—218 |
| 2,648,506 | 8/1953 | Kirby | 242—218 |
| 2,977,065 | 3/1961 | Holahan, Jr. | 242—218 |

BILLY S. TAYLOR, Primary Examiner